United States Patent
Farooq et al.

(10) Patent No.: US 9,758,127 B1
(45) Date of Patent: Sep. 12, 2017

(54) RESTRAINT SYSTEM

(71) Applicant: Ford Global Technologies, LLC, Dearborn, MI (US)

(72) Inventors: S.M. Iskander Farooq, Novi, MI (US); Mohammed Omar Faruque, Ann Arbor, MI (US); Dean M. Jaradi, Macomb, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 15/431,800

(22) Filed: Feb. 14, 2017

(51) Int. Cl.
| | |
|---|---|
| B60R 21/18 | (2006.01) |
| B60R 22/26 | (2006.01) |
| B60R 22/14 | (2006.01) |
| B60R 22/12 | (2006.01) |
| B60R 22/10 | (2006.01) |
| B60R 22/02 | (2006.01) |
| B60N 2/24 | (2006.01) |

(52) U.S. Cl.
CPC ............. B60R 22/26 (2013.01); B60R 21/18 (2013.01); B60R 22/14 (2013.01); B60N 2/24 (2013.01); *B60R 22/105* (2013.01); *B60R 22/12* (2013.01); *B60R 2022/027* (2013.01)

(58) Field of Classification Search
CPC ......... B60R 21/18; B60R 22/12; B60R 22/14; B60R 22/26
USPC .............................................. 280/730.1, 733
See application file for complete search history.

(56) References Cited

U.S. PATENT DOCUMENTS

| | | | |
|---|---|---|---|
| 3,827,716 A | 8/1974 | Vaughn et al. | |
| 5,655,817 A | 8/1997 | Nienow | |
| 6,733,398 B1 * | 5/2004 | Clerx | A63G 7/00 2/462 |
| 6,820,902 B2 | 11/2004 | Kim | |
| 7,258,188 B2 * | 8/2007 | Chernoff | B60R 21/18 180/268 |
| 8,505,670 B2 | 8/2013 | Ogawa et al. | |
| 9,126,557 B2 * | 9/2015 | Renaudin | B60R 21/16 |
| 2013/0009445 A1 * | 1/2013 | Cooper | A61F 5/026 297/468 |
| 2016/0272147 A1 * | 9/2016 | Fisher | B60R 22/023 |

FOREIGN PATENT DOCUMENTS

| | | | |
|---|---|---|---|
| DE | 4431658 A1 | 3/1996 | |
| DE | 19630561 A1 | 1/1997 | |
| DE | 102010055579 A1 | 6/2012 | |
| JP | 2010125992 A * | 6/2010 | ........... A41D 13/018 |

* cited by examiner

*Primary Examiner* — Faye M Fleming
(74) *Attorney, Agent, or Firm* — Frank A. MacKenzie; Bejin Bieneman PLC

(57) ABSTRACT

A restraint system in a vehicle includes a first retractor, a second retractor, a first webbing retractably coupled to the first retractor, a second webbing retractably coupled to the second retractor, a first lower vest panel attached to the first webbing, and a second lower vest panel attached to the second webbing. The lower vest panels are inflatable and releasably attachable to each other.

20 Claims, 9 Drawing Sheets

RESTRAINT SYSTEM

BACKGROUND

Vehicles include seatbelts for each of the seats onboard. The seatbelt includes webbing that, when the seatbelt is buckled, stretches across an occupant of the seat. An anchor attaches one end of the webbing to a seat frame. The other end of the webbing feeds into a retractor, which includes a spool that pays out and retracts the webbing. A clip slides freely along the webbing and, when engaged with a buckle, divides the webbing into a lap band and a shoulder band. The seatbelt is typically a three-point harness, meaning that the webbing is attached at three points around the occupant when fastened: the anchor, the retractor, and the buckle.

DETAILED DESCRIPTION

Figure 1:
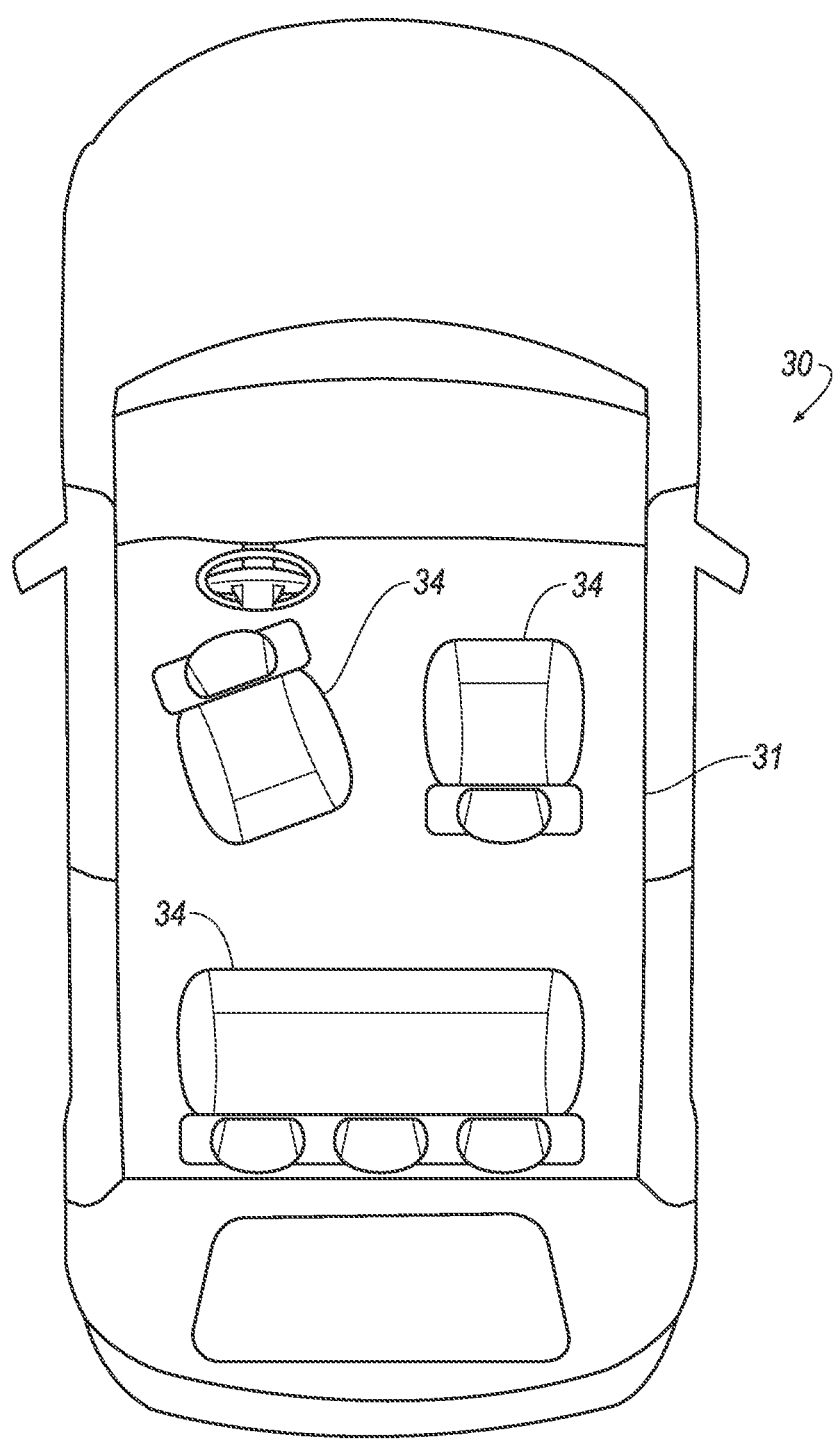
FIG. 1 is a top view of a vehicle with a passenger cabin exposed.

With reference to the Figures, wherein like numerals indicate like parts throughout the several views, a restraint system 32 for a seat 34 in a vehicle 30 includes a first retractor 52, a second retractor 54, a first lower webbing 58 retractably coupled to the first retractor 52, a second lower webbing 62 retractably coupled to the second retractor 54, a first lower vest panel 66 attached to the first webbing, and a second lower vest panel 70 attached to the second webbing. (The adjectives "first" and "second" are used throughout this document as identifiers and are not intended to signify importance or order.) The lower vest panels 66, 70 are inflatable and releasably attachable to each other.

The restraint system 32 may also include a seatback 38 having a first bolster 44 and a second bolster 46. The first retractor 52 may be disposed in the first bolster 44, and the second retractor 54 may be disposed in the second bolster 46.

One of the first and second vest lower vest panels 66, 70 may have a clip 86, and the other of the first and second vest lower vest panels 66, 70 may have a buckle 88. Additionally, one of the first and second vest lower vest panels 66, 70 may have a second clip 86, and the other of the first and second vest lower vest panels 66, 70 may have a second buckle 88.

The restraint system 32 may include an inflator 90 in communication with each of the lower vest panels 66, 70. Additionally, each lower webbing 58, 62 may have a first end 74 and a second end 76. The first end 74 of the first lower webbing 58 may be coupled to the first retractor 52; the second end 76 of the first lower webbing 58 may be coupled to the first lower vest panel 66; the first end 74 of the second lower webbing 62 may be coupled to the second retractor 54; the second end 76 of the second lower webbing 62 may be coupled to the second lower vest panel 70. The restraint system 32 may also include a first lower tube 92 extending in the first lower webbing 58 from the first end 74 to the second end 76, and a second lower tube (not shown) extending in the second lower webbing 62 from the first end 74 to the second end 76. The second lower tube may be identical to the first lower tube 92 on the opposite side of the seat 34. Further additionally, the restraint system 32 may also include a first lower fill line 100 extending from the inflator 90 to the first end 74 of the first lower webbing 58 and in communication with the first lower tube 92, and a second lower fill line (not shown) extending from the inflator 90 to the first end 74 of the second lower webbing 62 and in communication with the second lower tube. The second lower fill line may be identical to the first lower fill line 100 on the opposite side of the seat 34.

The restraint system 32 may also include a first inflator 90 in communication with the first lower vest panel 66, and a second inflator 90 in communication with the second lower vest panel 70.

The restraint system 32 may also include a first upper vest panel 68 coupled to the first retractor 52 above the first lower vest panel 66, and a second upper vest panel 72 coupled to the second retractor 54 above the second lower vest panel 70. Additionally, the restraint system 32 may include a first upper webbing 60 coupled to the first retractor 52, and a second upper webbing 64 coupled to the second retractor 54. The first upper vest panel 68 may be attached to the first upper webbing 60, and the second upper vest panel 72 may be attached to the second upper webbing 64. Alternatively or additionally, the upper vest panels 68, 72 may be releasably attachable to each other. Further additionally, one of the first and second lower vest panels 66, 70 may have the clip 86, and the other of the first and second lower vest panels 66, 70 has the buckle 88. One of the first and second upper vest panels 68, 72 may have the clip 86, and the other of the first and second upper vest panels 68, 72 may have the buckle 88.

Each lower vest panel 66, 70 may have a lower corner 80 and an upper corner 78. The first lower webbing 58 may be attached to the first lower vest panel 66 at the lower corner 80, and the second lower webbing 62 may be attached to the second lower vest panel 70 at the lower corner 80. The restraint system 32 may also include the first upper webbing 60 retractably coupled to the first retractor 52 and attached to the upper corner 78 of the first lower vest panel 66, and a second upper webbing 64 retractably coupled to the second retractor 54 and attached to the upper corner 78 of the second lower vest panel 70.

The restraint system 32 may include the seatback 38 having the first bolster 44 and the second bolster 46, the first lower vest panel 66 coupled to the first bolster 44, the second lower vest panel 70 coupled to the second bolster 46, the first upper vest panel 68 coupled to the first bolster 44, and the second upper vest panel 72 coupled to the second bolster 46. The upper vest panels 68, 72 may be disposed above the lower vest panels 66, 70 relative to the seatback 38. The lower and upper vest panels 66, 68, 70, 72 may be inflatable.

The restraint system 32 may also include the inflator 90 in communication with each of the lower and upper vest panels 66, 68, 70, 72. Additionally, the inflator 90 may be disposed in the seatback 38.

The restraint system 32 may also include two inflators 90. One of the inflators 90 may be in communication with one of the upper vest panels 68, 72 and one of the lower vest panels 66, 70, and the other of the two inflators 90 may be in communication with the other of the upper vest panels 68, 72 and the other of the lower vest panels 66, 70. Additionally, the two inflators 90 may be disposed in the seatback 38.

The upper vest panels 68, 72 may be releasably attachable to each other, and the lower vest panels 66, 70 may be releasably attachable to each other. Additionally, one of the lower vest panels 66, 70 may have the clip 86, and the other of the lower vest panels 66, 70 may have the buckle 88. One of the upper vest panels 68, 72 may have the clip 86, and the other of the upper vest panels 68, 72 may have the buckle 88.

The restraint system 32 affords greater freedom in repositioning the seat 34 in a passenger cabin (not shown) of the vehicle 30. For example, the restraint system 32 provides protection in a vehicle impact if the seat 34 is facing in a vehicle-forward direction, a vehicle-backward direction, or some orientation in between. The restraint system 32 may reduce torso deflection and may thus reduce injury from the occupant impacting other components of the vehicle 30. The restraint system 32 may also reduce injury by distributing a load over a large torso area during an impact.

With reference to FIG. 1, the vehicle 30 includes a passenger cabin 31 to house occupants, if any, of the vehicle 30. The passenger cabin 31 includes one or more seats 34, including front seats 34 disposed at a front of the passenger cabin and back seats 34 disposed behind the front seats. The passenger cabin 31 may also include third-row seats (not shown) at a rear of the passenger cabin 31. In FIG. 1, the front seats 34 are shown to be bucket seats and the back seats 34 to be bench seats, but the seats 34 may be other types. The position and orientation of the seats and components thereof may be adjustable by an occupant. Particularly if the vehicle 30 is an autonomous vehicle, the seats 34 may be rotatable to face a different direction in the passenger cabin 31 than only forward. The seats 34 may be rotatable up to 360° between a front-facing position and a rear-facing position. In FIG. 1, one of the seats 34 is in a rear-facing position, and the others of the seats 34 are in front-facing positions.

With reference to FIGS. 2-7, each seat 34 may include a seatback 38, a seat bottom 36, and a headrest 40. The headrest 40 may be supported by the seatback 38 and may be stationary or movable relative to the seatback 38. The seatback 38 may be supported by the seat bottom 36 and may be stationary or movable relative to the seat bottom 36. The seatback 38, the seat bottom 36, and/or the headrest 40 may be adjustable in multiple degrees of freedom. Specifically, the seatback 38, the seat bottom 36, and/or the headrest 40 may themselves be adjustable, in other words, adjustable components within the seatback 38, the seat bottom 36, and/or the headrest 40, and/or may be adjustable relative to each other. The seat 34 may be rotatably mounted on a pedestal 41.

The seat 34 may include a seat frame 42. The seat frame 42 may include panels and/or may include tubes, beams, etc. The seat frame 42 may support cushions in the seatback 38, seat bottom 36, and/or headrest 40. The frame may be formed of any suitable plastic material, e.g., carbon fiber reinforced plastic (CFRP), glass fiber-reinforced semi-finished thermoplastic composite (organosheet), etc. Alternatively, for example, some or all components of the frame may be formed of a suitable metal, e.g., steel or aluminum.

With continued reference to FIGS. 2-7, the seatback 38 has a first bolster 44 and a second bolster 46. The bolsters 44, 46 are spaced from each other. The seatback 38 may terminate at the bolsters 44, 46. A support surface 48 may extend from the first bolster 44 to the second bolster 46. The bolsters 44, 46 may extend from the support surface 48 in a direction that an occupant of the seat 34 would face, that is, in a forward direction as defined by the seat 34. The bolsters 44, 46 may extend along the seatback 38 in an upward direction as defined by the seat 34. The bolsters 44, 46 may support an occupant laterally relative to the seat 34.

Figure 8:
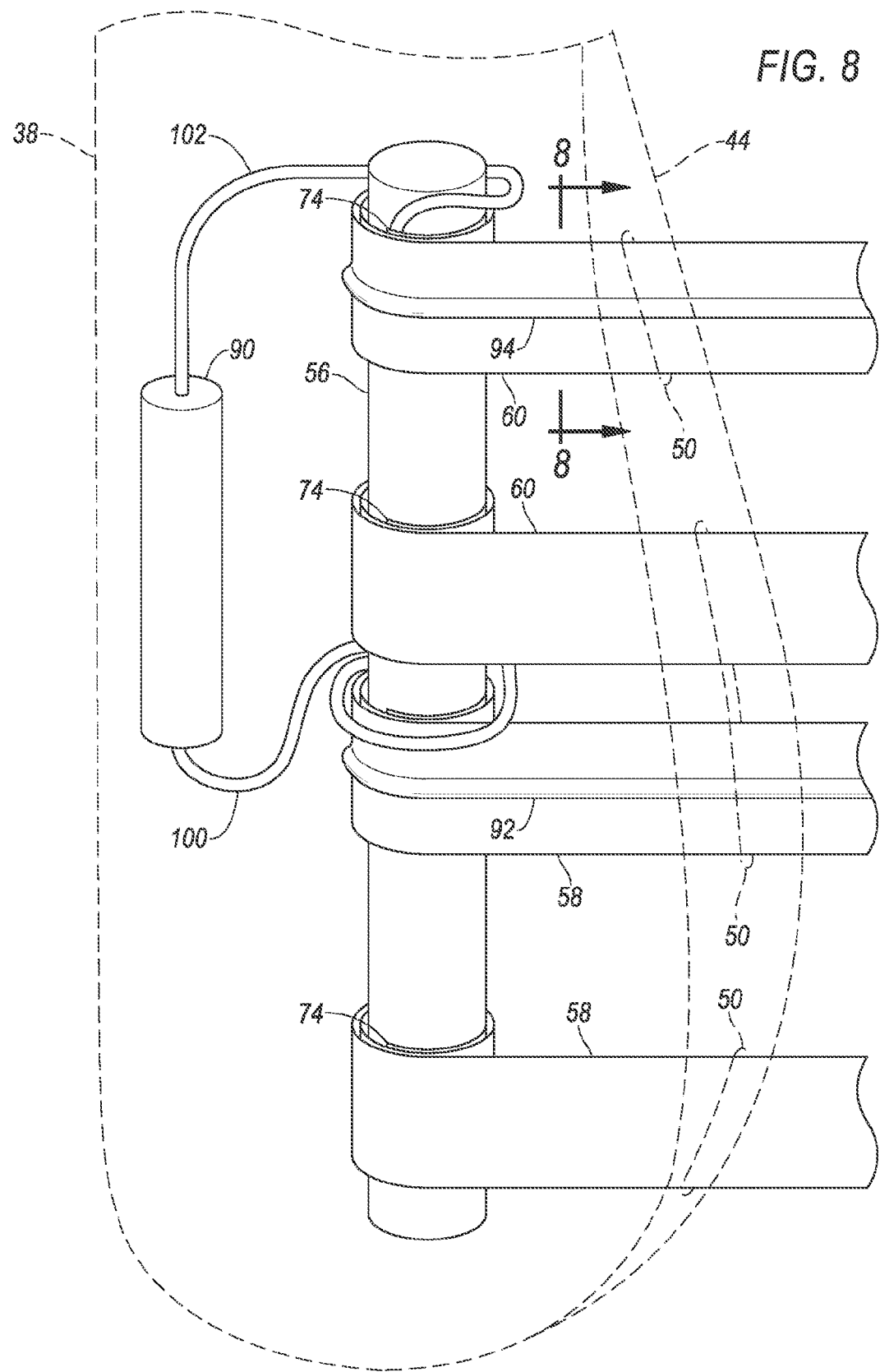
FIG. 8 is a perspective view of a retractor assembly and inflator of the restraint system.

With reference to FIG. 8, the bolsters 44, 46 may include passages 50 through which the webbings 58, 60, 62, 64 can pass. The passages 50 may be elongated in a direction parallel to the seatback 38, that is, a direction in which the bolsters 44, 46 are elongated. The passages 50 may be longer than a width of the webbings 58, 60, 62, 64 and wider than a thickness of the webbings 58, 60, 62, 64.

With reference to FIGS. 2-8, the first retractor 52 is disposed in the first bolster 44, and the second retractor 54 is disposed in the second bolster 46. The retractors 52, 54 each may include a spool 56 and a radial spring (not shown). The spools 56 may be cylindrically shaped and oriented in a direction parallel to the seatback 38, that is, a direction in which the bolsters 44, 46 are elongated. The radial spring may be biased to cause the retractor 52, 54 to retract, that is, rotate so as to pull the webbings 58, 60, 62, 64 into the retractor 52, 54. The retractors 52, 54 may include other known components such as pretensioners, torsion bars, emergency-locking mechanisms, etc. Alternatively, each bolster may include multiple retractors 52, 54, such as one for each of the lower vest panels 66, 70 and upper vest panels 68, 72.

The webbings 58, 60, 62, 64 are flexible and have a straplike shape, with a length longer than a width and a width longer than a thickness. The webbings 58, 60, 62, 64 are elongated along the length, and each of the webbings 58, 60, 62, 64 extends from a first end 74 to a second end 76. The webbings 58, 60, 62, 64 may be formed of a fabric, e.g., woven nylon. The webbings 58, 60, 62, 64 may include two first upper webbings 60, two first lower webbings 58, two second upper webbings 64, and two second lower webbings 62.

With reference to FIG. 8, the first webbings 58, 60 are retractably coupled to the first retractor 52, and the second webbings 62, 64 are retractably coupled to the second retractor 54. In other words, the webbings 58, 60, 62, 64 are each coupled to one of the retractors 52, 54 so as to be retractable by the retractors 52, 54. The first end 74 of each of the webbings 58, 60, 62, 64 is coupled to one of the retractors 52, 54. Each of the webbings 58, 60, 62, 64 is wound around one of the retractors 52, 54. Specifically, the webbings 58, 60, 62, 64 are wound in a direction opposite the biases of the radial springs of the retractors 52, 54, i.e., counterclockwise if the radial spring is biased clockwise relative to the spool 56 and clockwise if the radial spring is biased counterclockwise relative to the spool 56.

With reference to FIGS. 2-7, the second end 76 of each of the webbings 58, 60, 62, 64 is coupled to one of the vest panels 66, 68, 70, 72. The first upper webbings 60 are coupled to the first upper vest panel 68; the first lower webbings 58 are coupled to the first lower vest panel 66; the second upper webbings 64 are coupled to the second upper vest panel 72; and the second lower webbings 62 are coupled to the second lower vest panel 70. For each pair of webbings 58, 60, 62, 64 coupled to one of the vest panels 66, 68, 70, 72, one of the pair of webbings 58, 60, 62, 64 may be coupled to an upper corner 78, and the other of the pair of webbings 58, 60, 62, 64 may be coupled to a lower corner 80. The webbings 58, 60, 62, 64 may be coupled to the vest panels 66, 68, 70, 72 in any suitably reliable manner, e.g., sewing, stapling, bolting, etc.

The first lower vest panel 66 is attached to the first lower webbings 58, and the second lower vest panel 70 is attached to second lower webbings 62. The lower vest panels 66, 70 may each extend from an outside edge 82 to an inside edge 84. The lower vest panels 66, 70 may have a generally rectangular shape. The outside edge 82 may extend from the lower corner 80 to the upper corner 78 to which the webbings 58, 60, 62, 64 are attached.

The first upper vest panel 68 is attached to the first upper webbings 60, and the second upper vest panel 72 is attached to second upper webbings 64. The upper vest panels 68, 72 may each extend from an outside edge 82 to an inside edge 84. The upper vest panels 68, 72 may have a generally rectangular shape. The outside edge 82 may extend from the lower corner 80 to the upper corner 78 to which the webbings 58, 60, 62, 64 are attached.

Figure 2:
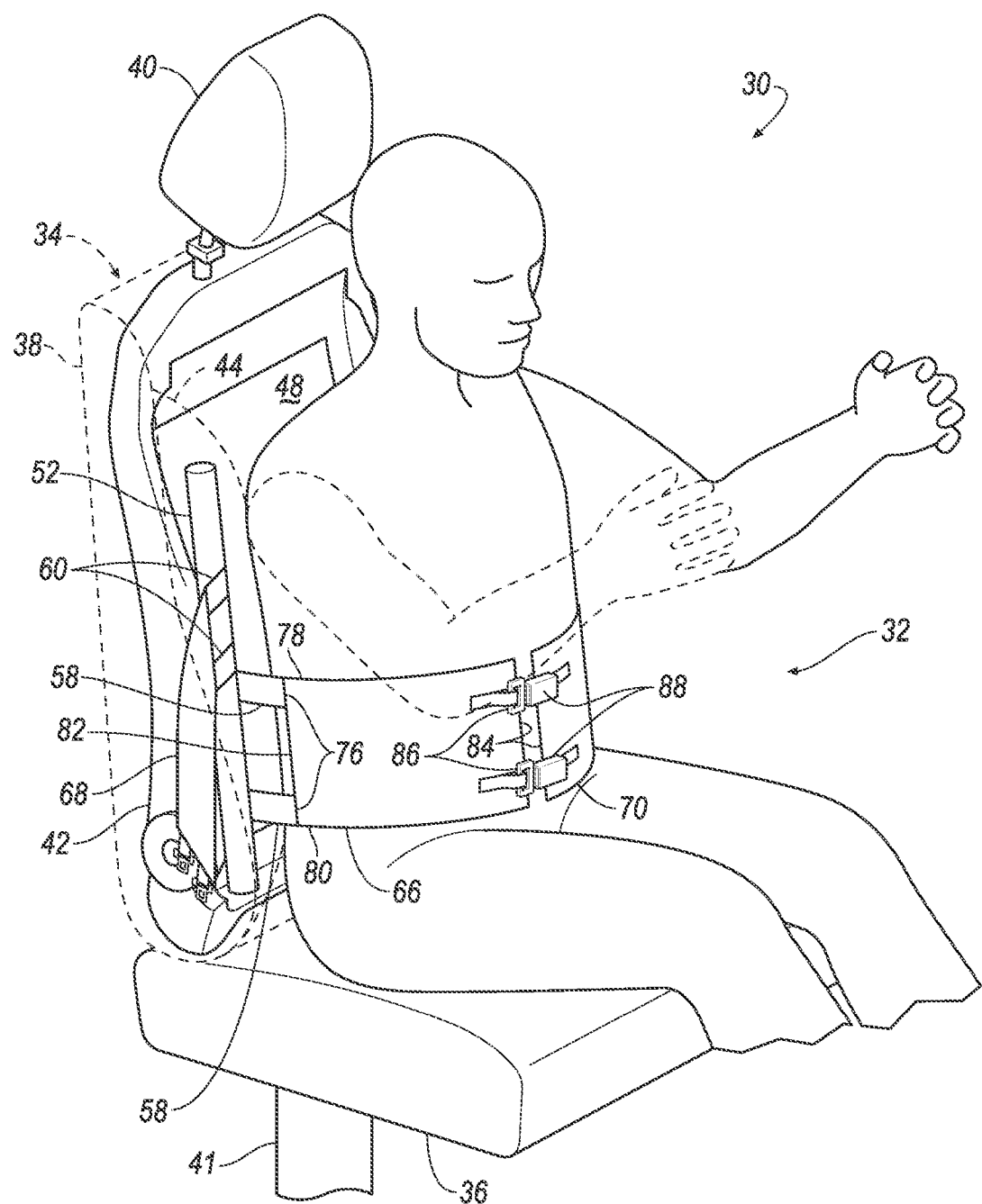
FIG. 2 is a perspective view of a seat having a restraint system including upper and lower vest panels in an uninflated state with the lower vest panels buckled.
Figure 3:
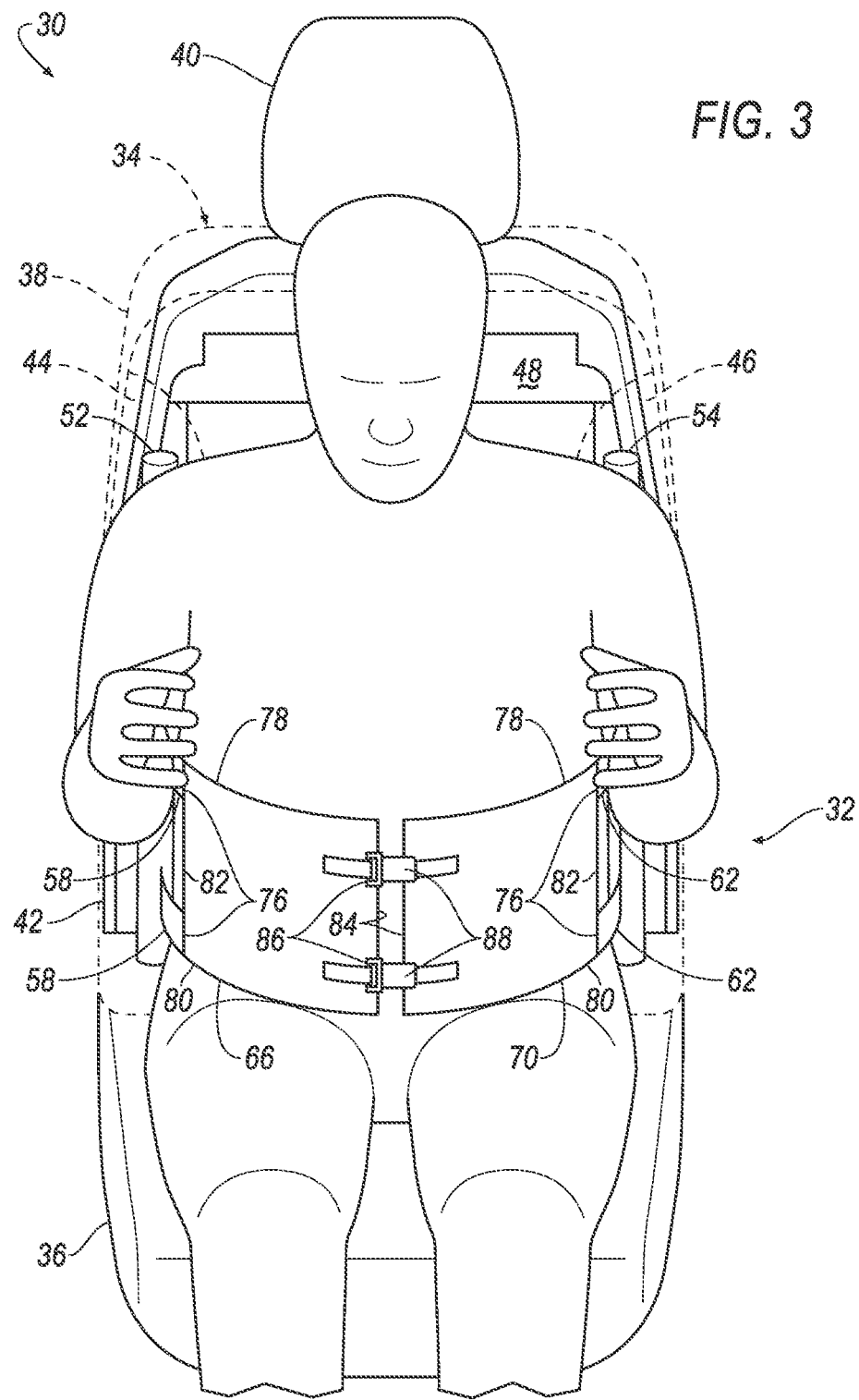
FIG. 3 is a front view of the seat with the upper and lower vest panels in the uninflated state and the lower vest panels buckled.
Figure 4:
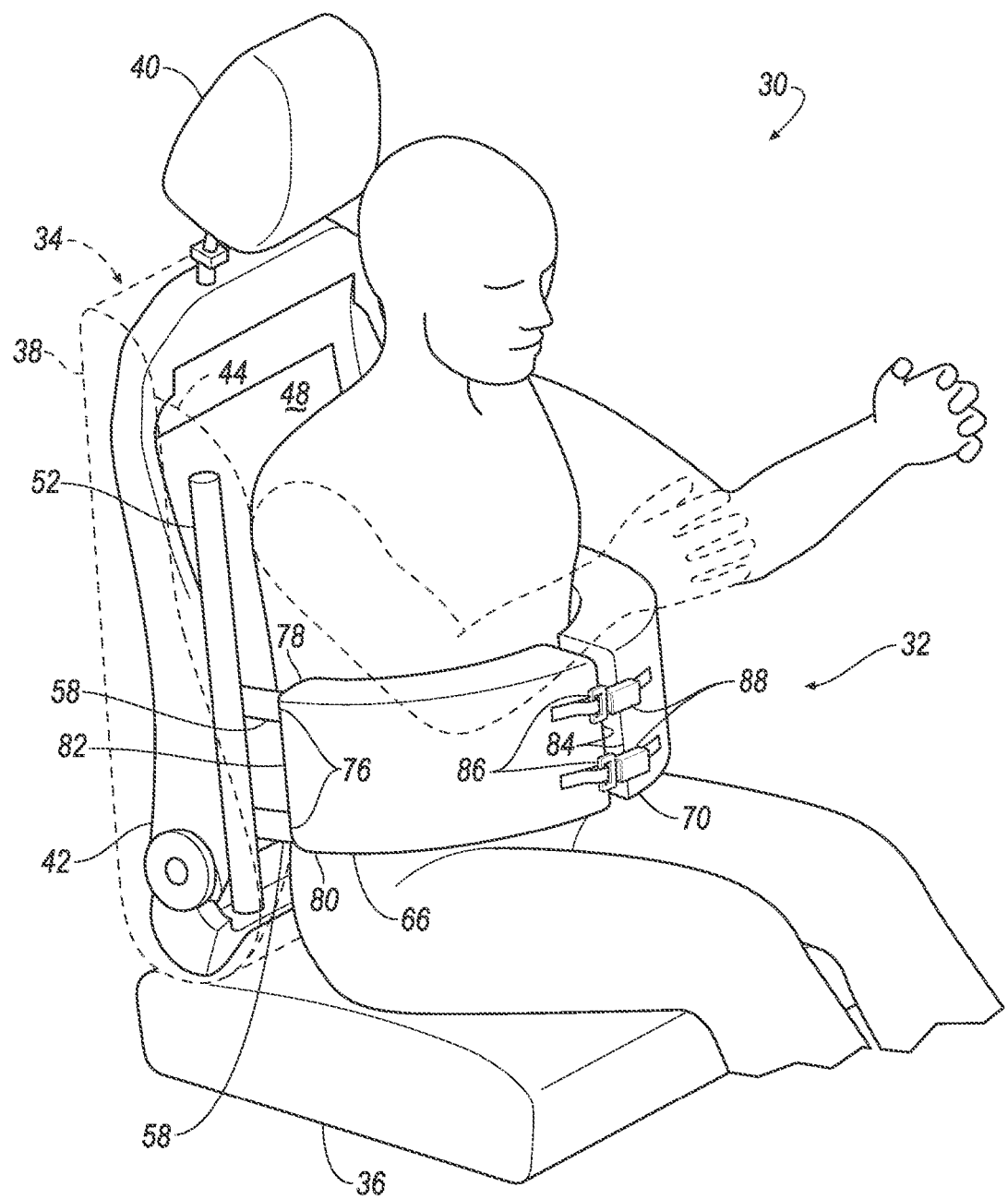
FIG. 4 is a perspective view of the seat with the upper and lower vest panels in an inflated state and the lower vest panels buckled.
Figure 5:
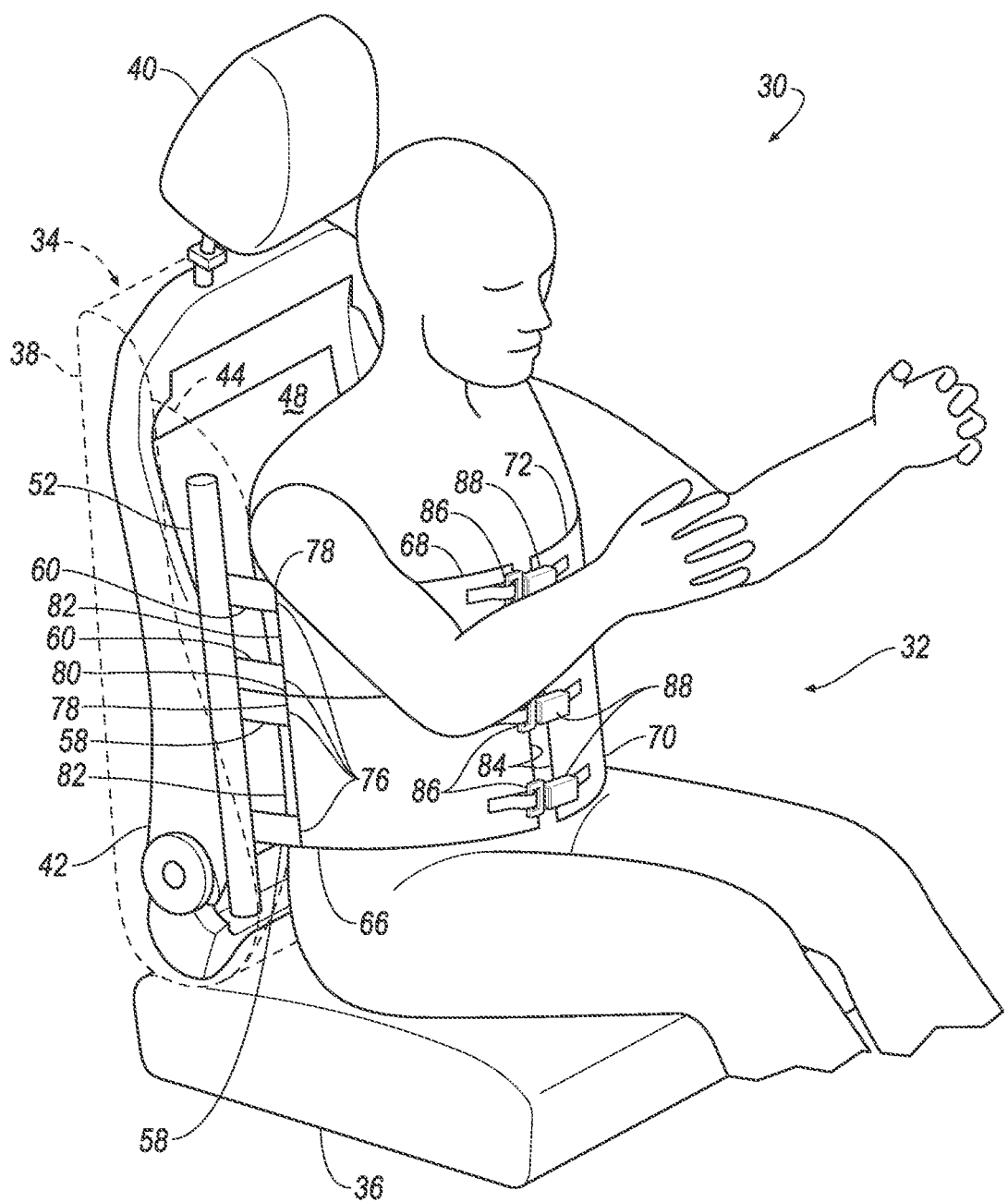
FIG. 5 is a perspective view of the seat with the upper and lower vest panels in the uninflated state and buckled.
Figure 6:
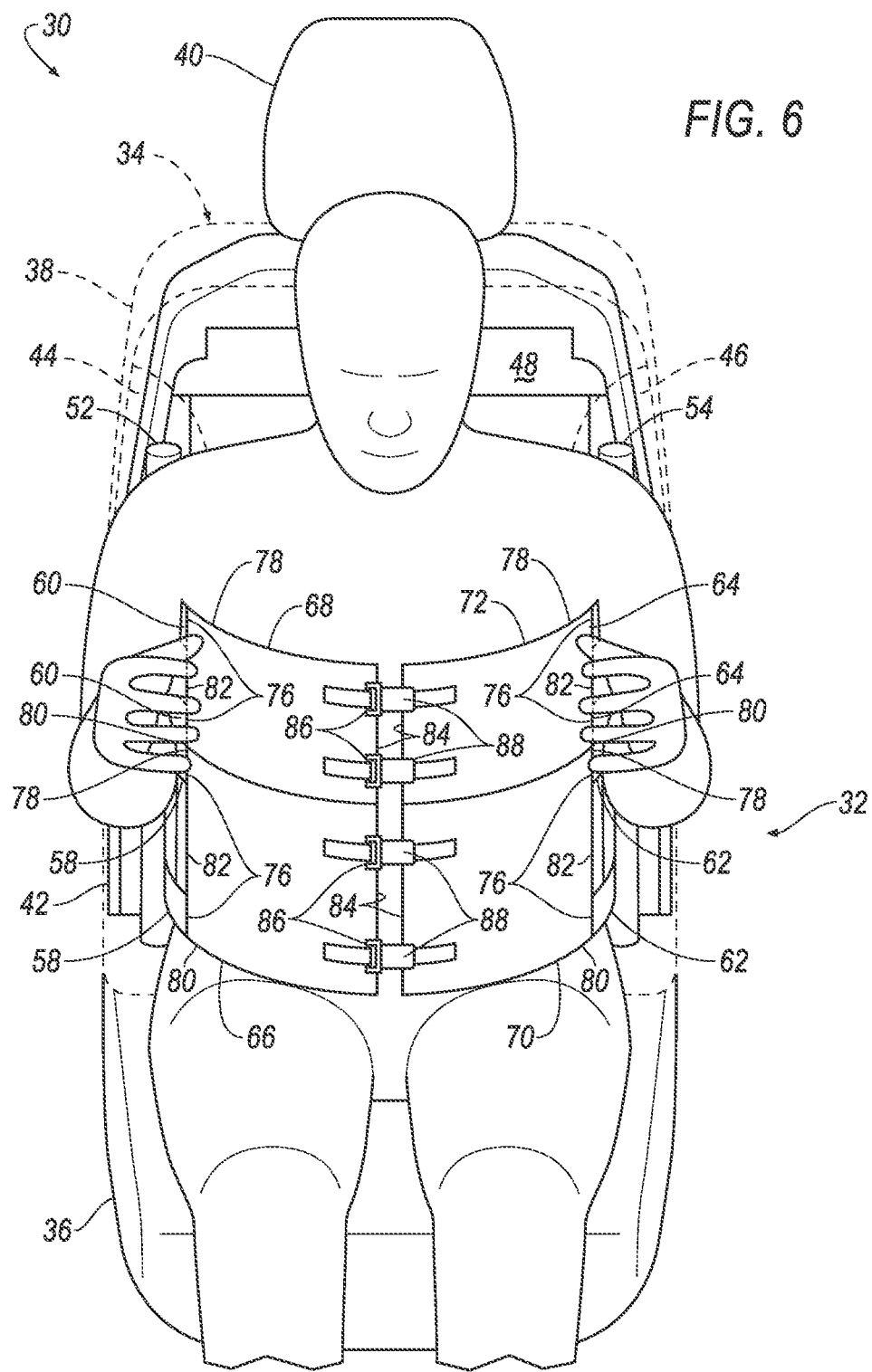
FIG. 6 is a front view of the seat with the upper and lower vest panels in the uninflated state and buckled.
Figure 7:
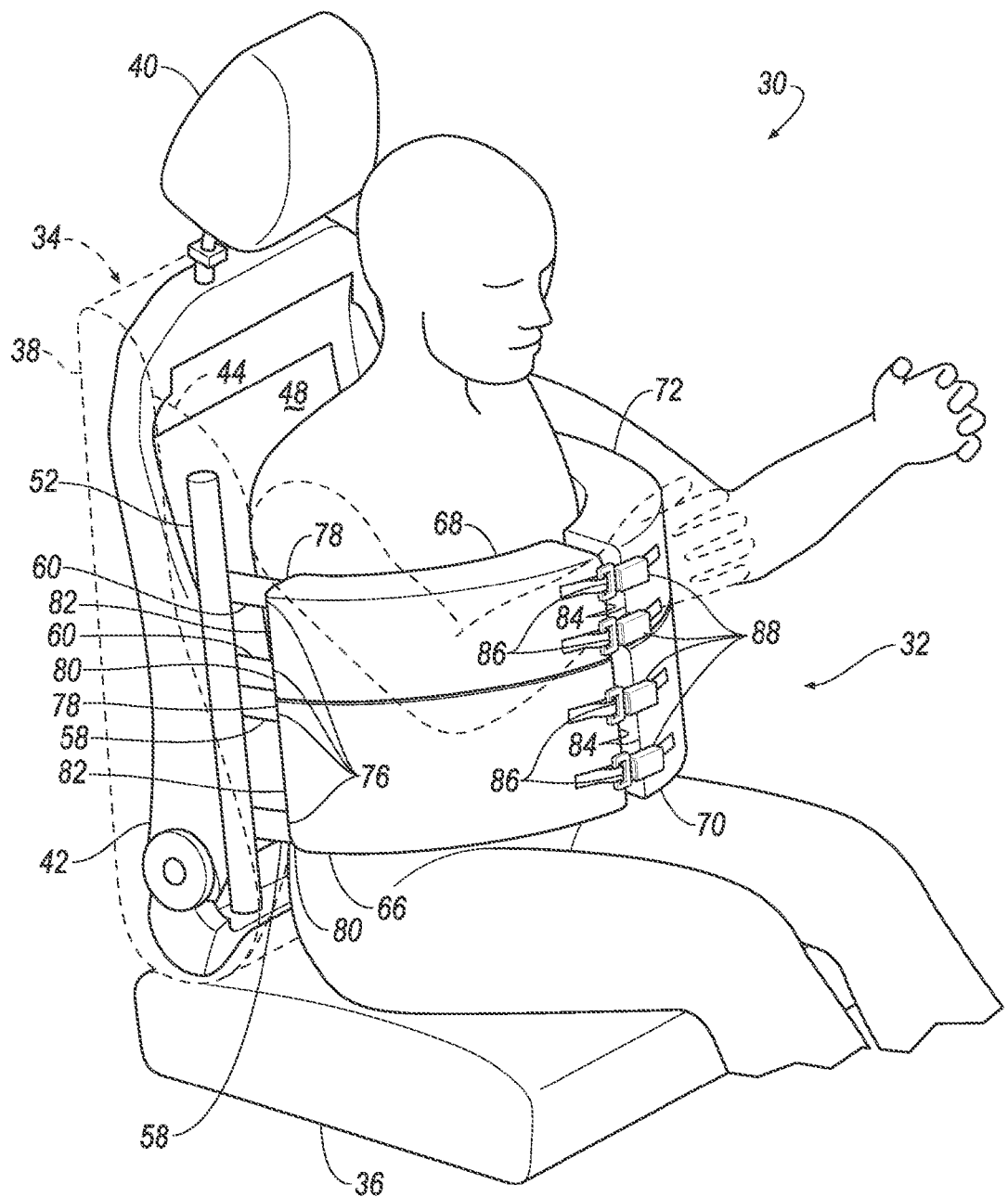
FIG. 7 is a perspective view of the seat with the upper and lower vest panels in the inflated state and buckled.

The vest panels 66, 68, 70, 72 are inflatable from an uninflated state to an inflated state. Specifically, the vest panels 66, 68, 70, 72 each have an inflation chamber (not numbered) that is inflatable with an inflation medium, as set forth further below. The inflation chambers of the vest panels 66, 68, 70, 72 may be fluidly separated from each other, i.e., not in fluid communication with each other. FIGS. 2, 3, 5, and 6 show the vest panels 66, 68, 70, 72 in the uninflated state. FIG. 4 shows the lower vest panels 66, 70 in the inflated state and the upper vest panels 68, 72 in the uninflated state. FIG. 7 shows the vest panels 66, 68, 70, 72 in the inflated state.

With continued reference to FIGS. 2-7, the upper vest panels 68, 72 are releasably attachable to each other, and the lower vest panels 66, 70 are releasably attachable to each other. Thus, each vest panel can be temporarily attached to the corresponding vest panel in a manner that is easily reversible by an occupant of the seat 34. In other words, the occupant may selectively release the upper vest panels 68, 72 and the lower vest panels 66, 70. For example, one of the lower vest panels 66, 70 may be equipped with a clip 86, and the other of the lower vest panels 66, 70 may be equipped with a buckle 88; likewise, one of the upper vest panels 68, 72 may be equipped with a clip 86, and the other of the upper vest panels 68, 72 may be equipped with a buckle 88. The lower vest panels 66, 70 may be releasably attached with another clip 86 and buckle 88, and the upper vest panels 68, 72 may also be releasably attached with another clip 86 and buckle 88.

Figure 10:
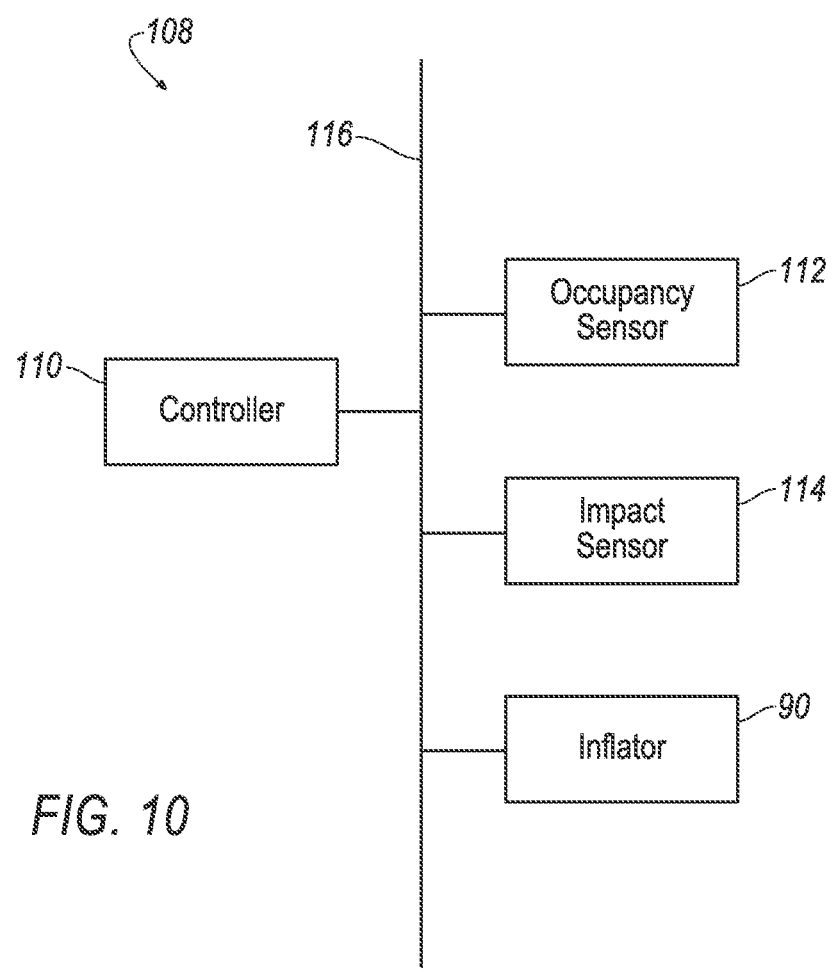
FIG. 10 is a block diagram of a control system of the restraint system.

With reference to FIGS. 8 and 10, an inflator 90 may be in communication with the vest panels 66, 68, 70, 72. The inflator 90 may be disposed in the seatback 38. Upon receiving a signal from, e.g., a controller 110, the inflator 90 may inflate the vest panels 66, 68, 70, 72 with an inflation medium, such as a gas. The inflator 90 may be, for example, a pyrotechnic inflator that uses a chemical reaction to drive inflation medium to the airbag. The inflator 90 may be of any suitable type, for example, a cold-gas inflator. The inflator 90 may have multiple chambers, e.g., dual-chambered, which can be independently discharged.

Alternatively, the restraint system 32 may have multiple inflators 90, e.g., two inflators 90. One of the inflators 90 may be in communication with one of the upper vest panels 68, 72 and one of the lower vest panels 66, 70, and the other of the inflators 90 may be in communication with the other of the upper vest panels 68, 72 and the other of the lower vest panels 66, 70. The inflators 90 may each have multiple chambers, e.g., dual-chambered, which can be independently discharged.

Figure 9:
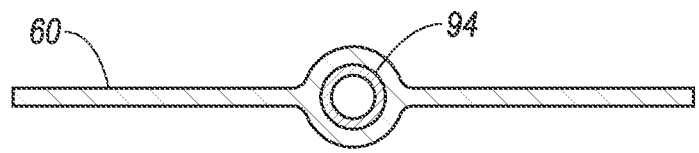
FIG. 9 is a cross-sectional view of webbing of the restraint system along line 8-8 in FIG. 7.

With reference to FIGS. 8 and 9, tubes 92, 94 may extend in some of the webbings 58, 60, 62, 64 from the first end 74 to the second end 76. For example, a first lower tube 92 may extend in one of the first lower webbings 58; a first upper tube 94 may extend in one of the first upper webbings 60; a second lower tube (not shown) may extend in one of the second lower webbings 62; and a second upper tube (not shown) may extend in one of the second upper webbings 64. The second lower and upper tubes may be symmetrical with the first lower and upper tubes 92, 94, respectively. The tubes 92, 94 may be flexible along their lengths. The tubes 92, 94 may be circumferentially stiff, for example, stiff enough to resist pinching closed from forces normally exerted on the tubes 92, 94 from, e.g., wrapping around the retractors 52, 54 with the webbings 58, 60, 62, 64.

With reference to FIG. 8, fill lines 100, 102 may extend from the inflator 90 to the first ends 74 of the webbings 58, 60, 62, 64 have the tubes 92, 94 and be in communication with the tubes 92, 94. For example, a first lower fill line 100 may extend from the inflator 90 to the first lower tube 92; a first upper fill line 102 may extend from the inflator 90 to the first upper tube 94; a second lower fill line (not shown) may extend from the inflator 90 to the second lower tube; and a second upper fill line (not shown) may extend from the inflator 90 to the second upper tube. The second lower and upper fill lines may be symmetrical with the first lower and upper fill lines 100, 102, respectively. The fill lines 100, 102 may be long enough to curl around the retractors 52, 54 when fully retracted and still have some slack. When the webbings 58, 60, 62, 64 are paid out from the retractors 52, 54, the fill lines 100, 102 may uncurl.

With reference to FIG. 10, the restraint system 32 may be connected to a control system 108 controlling inflation of the vest panels 66, 68, 70, 72. The control system 108 includes the controller 110 in communication with an occupancy sensor 112, an impact sensor 114, and the inflator 90. The control system 108 may transmit signals through a communications network 116 such as a controller area network (CAN) bus, Ethernet, Local Interconnect Network (LIN), and/or by any other wired or wireless communications network.

The control system 108 includes the occupancy sensor 112 configured to detect occupancy of the seat 34. The occupancy sensor 112 may be visible-light or infrared cameras directed at the seat 34, weight sensors inside the seat 34, or other suitable sensors. The occupancy sensor 112 is in communication with the controller 110 via the communications network 116.

The impact sensor 114 may be in communication with the controller 110. The impact sensor 114 is adapted to detect an impact to the vehicle 30. The impact sensor 114 may be of any suitable type, for example, post-contact sensors such as accelerometers, pressure sensors, and contact switches; and pre-impact sensors such as radar, LIDAR, and vision-sensing systems. The vision systems may include one or more cameras, CCD image sensors, CMOS image sensors, etc. The impact sensor 114 may be located at numerous points in or on the vehicle 30.

With continued reference to FIG. 10, the controller 110 may be a microprocessor-based controller. The controller 110 may include a processor, memory, etc. The memory of the controller 110 may include memory for storing instructions executable by the processor as well as for electronically storing data and/or databases.

In operation, an occupant of the seat 34 can choose to buckle either the lower vest panels 66, 70 or the lower vest panels 66, 70 and the upper vest panels 68, 72, depending on a size of the occupant. For a shorter occupant, such as a child or a woman in the 5th percentile for size, the occupant can buckle only the lower vest panels 66, 70, as shown in FIGS. 2-4. For a larger occupant, such as a man in the 95th percentile for size, the occupant can buckle the lower vest panels 66, 70 and the upper vest panels 68, 72, as shown in FIGS. 5-7. When the vest panels 66, 68, 70, 72 are not buckled together, the webbings 58, 60, 62, 64 are retracted by the retractors 52, 54, and the vest panels 66, 68, 70, 72 hang on the bolsters 44, 46.

In the event of an impact to the vehicle 30, the impact sensor 114 may detect the impact and transmit a signal through the communications network 116 to the controller 110. The occupancy sensor 112 may transmit a signal to the controller 110 indicating whether the seat 34 is occupied and, if so, a size of the occupant. If the seat 34 is unoccupied, the controller 110 does not transmit a signal to the inflator 90. If the seat 34 is occupied by a small occupant, the controller 110 may transmit a signal through the communications network 116 to the inflator 90, and the inflator 90 may discharge the appropriate chambers and inflate the lower vest panels 66, 70. If the seat 34 is occupied by a large occupant, the controller 110 may transmit a signal through the communications network 116 to the inflator 90, and the inflator 90 may discharge all the chambers and inflate the upper vest panels 68, 72 and the lower vest panels 66, 70.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A restraint system comprising:
    a first retractor and a second retractor;
    a first webbing retractably coupled to the first retractor, and a second webbing retractably coupled to the second retractor; and
    a first vest panel attached to the first webbing, and a second vest panel attached to the second webbing;
    the vest panels being inflatable and releasably attachable to each other.

2. The restraint system of claim 1, further comprising a seatback having a first bolster and a second bolster, wherein the first retractor is disposed in the first bolster, and the second retractor is disposed in the second bolster.

3. The restraint system of claim 1, wherein one of the first and second vest panels has a clip and the other of the first and second vest panels has a buckle.

4. The restraint system of claim 3, wherein one of the first and second vest panels has a second clip and the other of the first and second vest panels has a second buckle.

5. The restraint system of claim 1, further comprising an inflator in communication with each of the vest panels.

6. The restraint system of claim 5, wherein each webbing has a first end and a second end, the first end of the first webbing is coupled to the first retractor, the second end of the first retractor is coupled to the first vest panel, the first end of the second webbing is coupled to the second retractor, and the second end of the second webbing is coupled to the second vest panel; further comprising a first tube extending in the first webbing from the first end to the second end, and a second tube extending in the second webbing from the first end to the second end.

7. The restraint system of claim 6, further comprising a first fill line extending from the inflator to the first end of the first webbing and in communication with the first tube, and a second fill line extending from the inflator to the first end of the second webbing and in communication with the second tube.

8. The restraint system of claim 1, further comprising a first inflator in communication with the first vest panel, and a second inflator in communication with the second vest panel.

9. The restraint system of claim 1, further comprising a first upper vest panel coupled to the first retractor above the first vest panel, and a second upper vest panel coupled to the second retractor above the second vest panel.

10. The restraint system of claim 9, further comprising a first upper webbing coupled to the first retractor, the first upper vest panel being attached to the first upper webbing; and a second upper webbing coupled to the second retractor, the second upper vest panel being attached to the second upper webbing.

11. The restraint system of claim 9, wherein the upper vest panels are releasably attachable to each other.

12. The restraint system of claim 11, wherein one of the first and second vest panels has a clip and the other of the first and second vest panels has a buckle, and one of the first and second upper vest panels has a clip and the other of the first and second upper vest panels has a buckle.

13. The restraint system of claim 1, wherein each vest panel has a lower corner and an upper corner, the first webbing is attached to the first vest panel at the lower corner, the second webbing is attached to the second vest panel at the lower corner; further comprising a first upper webbing retractably coupled to the first retractor and attached to the upper corner of the first vest panel, and a second upper webbing retractably coupled to the second retractor and attached to the upper corner of the second vest panel.

14. A restraint system comprising:
    a seatback having a first bolster and a second bolster;
    a first lower vest panel coupled to the first bolster and a second lower vest panel coupled to the second bolster; and
    a first upper vest panel coupled to the first bolster and a second upper vest panel coupled to the second bolster, the upper vest panels being disposed above the lower vest panels relative to the seatback;
    the lower and upper vest panels being inflatable.

15. The restraint system of claim 14, further comprising an inflator in communication with each of the lower and upper vest panels.

16. The restraint system of claim 15, wherein the inflator is disposed in the seatback.

17. The restraint system of claim 14, further comprising two inflators, one of the two inflators in communication with one of the upper vest panels and one of the lower vest panels, and the other of the two inflators in communication with the other of the upper vest panels and the other of the lower vest panels.

18. The restraint system of claim 17, wherein the two inflators are disposed in the seatback.

19. The restraint system of claim 14, wherein the upper vest panels are releasably attachable to each other, and the lower vest panels are releasably attachable to each other.

20. The restraint system of claim 19, wherein one of the lower vest panels has a clip and the other of the lower vest panels has a buckle, and one of the upper vest panels has a clip and the other of the upper vest panels has a buckle.

\* \* \* \* \*